(No Model.) 2 Sheets—Sheet 1.
J. L. CULBERSON.
STOVE PIPE THIMBLE.
No. 417,154. Patented Dec. 10, 1889.
Fig. 1.
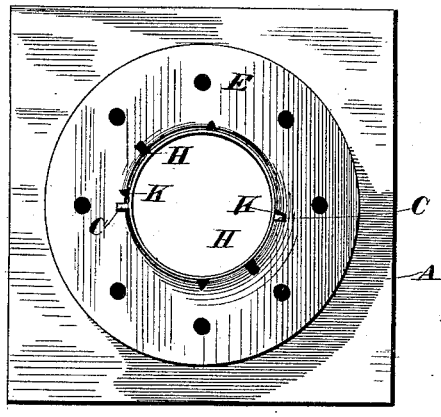
Fig. 2.
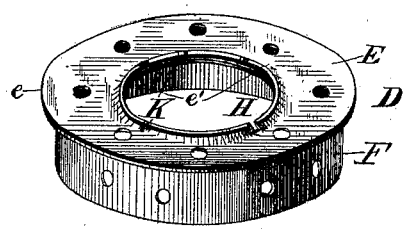
Fig. 3.
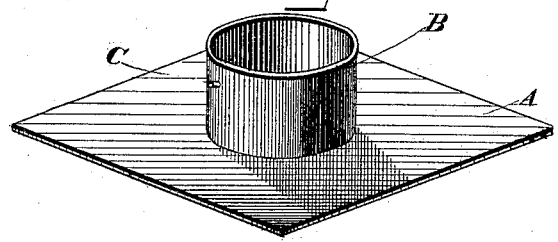
Fig. 4.
Witnesses:
F. R. Cornwall
Wm. H. Palmer
Fig. 5.
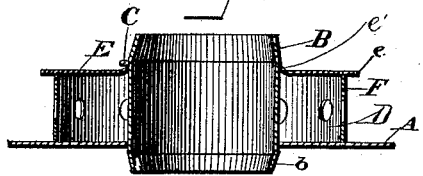
Inventor:
Jno. L. Culberson.
By L. S. Bacon,
His Atty.

(No Model.) 2 Sheets—Sheet 2.
J. L. CULBERSON.
STOVE PIPE THIMBLE.
No. 417,154. Patented Dec. 10, 1889.
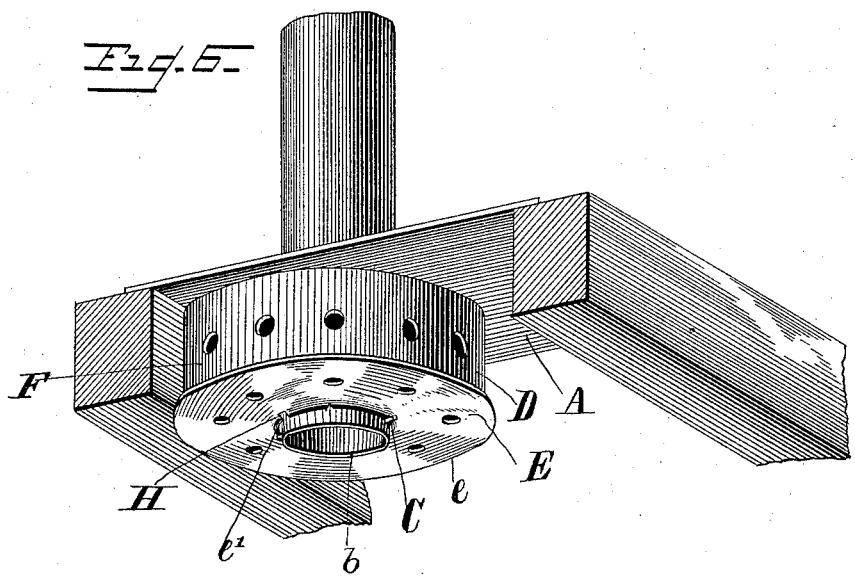
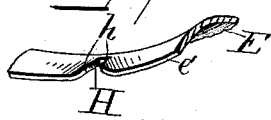

United States Patent Office.

JOHN L. CULBERSON, OF HENDRYSBURG, OHIO, ASSIGNOR OF ONE-HALF TO JAMES A. PRYOR, OF SAME PLACE.

STOVE-PIPE THIMBLE.

SPECIFICATION forming part of Letters Patent No. 417,154, dated December 10, 1889.

Application filed July 9, 1889. Serial No. 316,967. (No model.)

*To all whom it may concern:*

Be it known that I, JOHN L. CULBERSON, a citizen of the United States, residing at Hendrysburg, in the county of Belmont and State of Ohio, have invented certain new and useful Improvements in Stove-Pipe Thimbles; and I do hereby declare the following to be a full, clear, and exact description of the invention, such as will enable others skilled in the art to which it appertains to make and use the same.

My invention relates to an improvement in stove-pipe thimbles; and it consists in the construction and arrangement of the parts thereof, which will be more fully hereinafter described, and definitely pointed out in the claims.

The object of my invention is to provide a thimble for pipes which can be readily detached for cleaning purposes and easily adjusted in position.

A further object of my invention is to provide a simple, cheap, and effective device of the character above mentioned. I attain these objects by the construction illustrated in the accompanying drawings, wherein like letters of reference indicate corresponding parts in the several views, and in which—

Figure 1 is a plan view from the under side. Figs. 2 and 3 are perspective views of the parts detached. Fig. 4 is a longitudinal vertical section of the thimble inverted, and Fig. 5 is a detail of the locking notch and groove, respectively. Fig. 6 is a perspective view of the device in its normal position, showing the joists in section; and Fig. 7 is a perspective view of the flange and the groove H.

In the drawings, A represents the supporting-plate, rectangular in shape and having a circular opening through which passes a cylindrical pipe B, it being secured permanently and rigidly to the plate, one end $b$ projecting slightly beyond the outer face of the plate to afford a suitable coupling edge for a pipe or flue above. The opposite end of the pipe B is extended out beyond the plate and has two lugs C projecting out from its sides near its outer edge. The ends of this pipe B are tapered or inclined, as shown in Fig. 4, to fit different-size pipes.

D represents the air-drum, surrounding the pipe B below the plate. It is made with a circular base E, with perforations therein, from which extends the cylindrical perforated wall F, the circumference of which is less than the base E, thereby leaving a flange or projecting outer edge $e$ on the drum for purposes hereinafter stated. The wall F is permanently secured to the base E and extends up to and is placed in contact with the under side of plate A. At the center of the base E is formed an opening through which the pipe B passes and protrudes beyond. The edges of metal at the opening in the base are flared or bent up, as at $e'$, Figs. 2 and 4, and have rectangular grooves H formed therein on opposite sides of the opening, through which the lugs C pass when the drum is to be adjusted. The ends or corners $h$ of the plate adjacent to the groove are inclined downwardly to permit the lugs to ride up onto the flared edges of the base.

At intervals between the grooves H, I form small V-shaped notches K, in which the lugs rest to prevent their displacement on the base.

In applying my device I place the plate A on the joists of the ceiling, the edge $b$ of the pipe B extending above the floor. The opening is made in the ceiling through which the pipe B passes and into which the drum D is inserted, the edges $e$ of the drum projecting beyond the edges of the lath or opening in the ceiling, thus hiding the rough edges of the opening. As the drum is forced into the opening in the ceiling, the lugs C on the pipe B are forced through the grooves H of the drum. The drum is then turned, forcing the lugs up onto the bent-up edges, and thus draws the drum up snugly against the plate A and completes the thimble. It will be noted that by this form of construction the drum can be easily taken down and the accumulation of dust, dirt, and other material readily taken out. The drum may then be readjusted in position with but little trouble. This construction avoids the necessity of extending the stove-pipe through the thimble, and also acts as a support for the pipe in the compartment above.

I am aware that many minor changes in the construction and arrangement of the parts of my device can be made and substituted for those shown and described without in the least departing from the nature and principle of my invention.

Having thus described my invention, what I claim as new, and desire to secure by Letters Patent, is—

1. In a stove-pipe thimble, the combination, with the supporting-plate, of a pipe rigidly secured thereto and extending through the same on both sides, lugs formed on the lower edges of said pipe, a detachable perforated drum surrounding the pipe below the plate, having grooves in its inner edges, through which the said lugs are adapted to pass, substantially as described.

2. In a stove-pipe thimble, the combination, with the supporting-plate A, of the pipe B, extending through on both sides and rigidly secured to the plate, lugs C on the lower end of the pipe, the perforated drum D, surrounding the pipe below the plate, formed with a bent-up inner edge having grooves H therein and a flanged outer edge, substantially as described.

3. The combination of the plate A, pipe B, having lugs C on its end, and the drum D, consisting of a perforated base E and wall F, the base having a struck-up inner edge formed with notches K therein, substantially as described.

In testimony whereof I affix my signature in presence of two witnesses.

JOHN L. CULBERSON.

Witnesses:
JOHN J. KIRK,
G. W. WILKINS.